United States Patent [19]

McManus

[11] 3,714,364
[45] Jan. 30, 1973

[54] PROCESS FOR LOWERING BLOOD SUGAR LEVELS
[75] Inventor: James M. McManus, Old Lyme, Conn.
[73] Assignee: Pfizer Inc., New York, N.Y.
[22] Filed: April 9, 1971
[21] Appl. No.: 132,803

[52] U.S. Cl. .................................................424/326
[51] Int. Cl. .............................................A61k 27/00
[58] Field of Search.......................................424/326

[56] References Cited

UNITED STATES PATENTS

| | | | |
|---|---|---|---|
| 3,168,662 | 2/1965 | Walton et al. | 260/564 |
| 3,288,677 | 11/1966 | Bavvett et al. | 260/564 |
| 3,541,218 | 11/1970 | Marshall et al. | 424/326 |

OTHER PUBLICATIONS

Chemical Abstracts 47: 8079 f (1953)
Dvornik, Biochemical Phaumacology, Vol. 12, p 229–40 (1963)

Primary Examiner—Jerome D. Goldberg
Attorney—Connolly and Hutz

[57] ABSTRACT m- and p-Fluorobenzylguanidines and their acid addition salts have been prepared and found to be active as hypoglycemic agents. m-Fluorobenzyl-guanidine hydrogen sulfate and p-fluorobenzylguanidine hydrogen sulfate are particularly effective in lowering blood sugar levels by the oral route of administration.

6 Claims, No Drawings

PROCESS FOR LOWERING BLOOD SUGAR LEVELS

CROSS REFERENCE TO RELATED APPLICATIONS

This application is a continuation of U.S. patent application Ser. No. 712,613, filed Mar. 13, 1968 now abandoned.

BACKGROUND OF THE INVENTION

This invention relates to new and useful halophenylalkylguanidine compounds, which are effective in reducing blood sugar levels. More particularly, it is concerned with certain novel fluorobenzylguanidines and their pharmaceutically acceptable salts, which are useful as oral hypoglycemic agents for lowering the blood sugar levels of diabetic subjects.

In the past, various attempts have been made by investigators in the field of organic medicinal chemistry to obtain new and useful oral hypoglycemic agents. For the most part, these efforts have involved the synthesis and testing of various sulfonylurea compounds and/or compounds that are in some way related in structure to the sulfonylureas, such as the sulfamylureas. However, in the search for still newer and better oral hypoglycemic agents, very little is known about the activity of non-sulfonylureas and this is particularly so in the case of various halophenylalkylguanidine compounds. For instance, the closest prior art is D. Dvornick et al., in Biochemical Pharmacology, Vol. 12, pp. 229-240 (1963), who disclose o-fluorobenzylguanidine to be a monoamine oxidase inhibitor.

SUMMARY OF THE INVENTION

In accordance with the present invention, it has now been found surprisingly that certain select fluorobenzylguanidine compounds (exclusive of the aforementioned ortho isomer), i.e., non-sulfonylureas, are extremely useful when employed as oral hypoglycemic agents for the treatment of diabetic subjects. The novel compounds of this invention are selected from the group consisting of meta- and para-fluorobenzylguanidine bases of the formula:

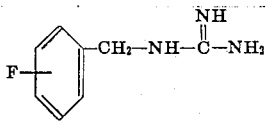

and the mineral and organic acid addition salts thereof. Compounds specifically embraced by this invention include m-fluorobenzylguanidine, p-fluorobenzylguanidine and their pharmaceutically acceptable acid addition salts, such as the hydrogen sulfate salt. These compounds are all useful in lowering blood sugar levels when administered by the oral route of administration.

DETAILED DESCRIPTION OF THE INVENTION

In accordance with the process employed for preparing the novel compounds of this invention, an appropriate fluorobenzylamine compound, i.e., either m- or p-fluorobenzylamine, is reacted with a suitable S-(lower alkyl) isothiouronium salt. This particular reaction is normally carried out in a reaction-inert polar solvent medium at a temperature ranging from about 20° C. to about 120° C. for a period of about 4to 72 hours, and most conveniently at a temperature ranging from about 60° C. to about 10° C. for from about 4 to 20 hours. In practice, it is generally most convenient to heat the two reactants together under reflux in the polar solvent, employing substantially equimolar amounts of starting materials for this purpose although a slight excess of one or the other is not harmful in this respect. The desired S-alkyl isothiouronium salt reagent is, of course, one where the S-alkyl group is preferably lower alkyl in view of relative ease with which such a reaction takes place due to the more volatile nature of the by-products formed, viz., the lower boiling mercaptans. Preferred reaction-inert polar solvents for use in this connection include water, lower alkanols, such as methanol, ethanol and isopropanol, etc., and N,N-di(lower alkyl)alkanoamides such as N,N-dimethylformamide, N,N-dimethylacetamide, N,N-diethylformamide, N,N-diethylacetamide, N,N-di(n-propyl)formamide, N,N-dimethylpropionamide, and so forth, as well as mixtures of either of these two aforementioned type organic solvents with water. Upon completion of the reaction, the solvent is removed by means of conventional procedures and the resulting residue is then taken up in a suitable solvent system, such as one of the aforementioned types, from which it can be subsequently crystallized. Alternatively, the product may separate first from the reaction mixture either during the course of the reaction or immediately thereafter, or it may be crystallized from the reaction solution after some initial concentration of same. A final conversion to the desired organic base compound can then be effected by treating the fluorobenzylguanidine acid addition salt thus obtained with sufficient base in water to neutralize same, e.g., an alkaline reagent such as sodium hydroxide in water can be used. Recovery of the desired free organic base compound can then be had by extracting the aforesaid aqueous solution with a suitable water-immiscible organic solvent of low volatility, such as a halogenated aliphatic hydrocarbon solvent like methylene chloride, for example.

The starting materials required for the reaction process of this invention are either all known compounds or else they are easily prepared by those skilled in the art in accordance with standard organic procedures. For instance, the m- and p-fluorobenzylamines needed for conversion to the corresponding guanidines are both known compounds and can easily be obtained by means of synthesis from readily available starting materials. The corresponding S-alkyl isothiouronium salts, on the other hand, which are sometimes called 2-alkyl-2-thiopseudoureas, are all members of a well-known class of organic compounds and have been used as reagents in this general type of reaction in the past, i.e., the so-called "guanidine-forming" reaction.

Other methods which can be used to prepare the novel compounds of this invention include routes not involving the use of the S-alkyl isothiouronium intermediates and these are as follows: (1) the reaction of a fluorobenzyl alcohol sulfonate derivative with the appropriate guanidine salt to afford the corresponding fluorobenzylguanidine salt direct; (2) the reaction of a fluorobenzylamine compound with a salt or the appropriate guanylpyrazole base, such as 3,5-dimethyl-1-guanylpyrazole, to also form the corresponding fluorobenzylguanidine salt; (3) the reaction of a fluorobenzylamine salt, such as a hydrohalide, with a cyanamide like the parent compound itself or an appropriately substituted derivative thereof or by fusion reaction of said amine salt with a dicyanamide compound to also form the corresponding fluorobenzylguanidine salt direct; and finally, (4) the reaction of a fluorobenzylamine compound with a cyanogen halide, like cyanogen bromide, followed by the reaction of the resultant intermediate N-cyano product with ammonia or with an appropriate amine base to form the corresponding fluorobenzylguanidine compound.

Of all the alternate routes, the most preferred one is the previously mentioned process involving the reaction of a fluorobenzylamine compound, such as p-fluorobenzylamine, with a salt of the appropriate guanylpyrazole base to form the corresponding fluorobenzylguanidine salt direct. The preferred reagent here is a salt of 3,5-dimethyl-1-guanylpyrazole, such as the corresponding sulfate, but is also possible to employ other lower 3,5-dialkyl-1-guanylpyrazole salts in place of 3,5-dimethyl-1-guanylpyrazole sulfate and achieve equally satisfactory results as well. This particular process is generally carried out by heating the two reactants together in an aqueous solvent medium of the type previously discussed for the S-alkylisothiouronium method in the absence of any other reagent. Recovery of the desired product from the reaction mixture is then easily effected by evaporation of same under reduced pressure, followed by the subsequent crystallization of the resultant residue from either water or from an aqueous alcohol mixture.

Inasmuch as the fluorbenzylguanidine compounds of this invention are basic compounds, they are capable of forming a wide variety of salts with various mineral and organic acids. Although such salts must be pharmaceutically acceptable when the final products are intended for oral consumption, it is possible to first isolate the desired fluorobenzylguanidine compound from the reaction mixture as a pharmaceutically unacceptable salt and then to subsequently convert the latter, as indicated previously, to the free base compound by treatment with an alkaline reagent, followed by the final conversion to the pharmaceutically acceptable acid salt in the manner hereinafter indicated. For instance, the acid addition salts of the fluorobenzylguanidine compounds of this invention may be prepared by treating the base compound with a substantially equimolar amount of the chosen acid. The salt-formation step can be carried out in an aqueous solution or in a suitable organic solvent, such as methanol or ethanol. Upon careful evaporation of the solvent, the solid salt is obtained.

The acids which are used to prepare the pharmaceutically acceptable acid addition salts of the aforementioned fluorobenzylguanidine bases of this invention are those which form non-toxic acid addition salts containing pharmaceutically acceptable anions, such as the hydrochloride, hydrobromide, hydroiodide, nitrate, sulfate or bisulfate, phosphate or acid phosphate, acetate, citrate or acid citrate, tartrate or bitartrate, succinate, maleate, gluconate, saccharate, methanesulfonate, ethanesulfonate, benzenesulfonate and p-toluene-sulfonate salts.

As previously indicated, the fluorobenzylguanidine compounds of this invention are all readily adapted to therapeutic use as oral hypoglycemic agents in view of their ability to lower the blood sugar levels of diabetic subjects. For instance, p-fluorobenzylguanidine as the hydrogen sulfate salt has shown good hypoglycemic activity in the normal fasted rat, as well as in the mildly alloxanized rat and in the normal fasted dog, with pronounced hypoglycemia being observed in the latter animal at dose level ranging from about 5 mg./kg. to 20 mg./kg. Additionally, none of these compounds causes serious unwanted side effects to occur in the subjects to whom they are so administered, i.e., no problems of toxicity or any other untowards side effects of either a gross or microscopic pathological nature are encountered with these compounds when they are orally administered in the manner indicated above.

In accordance with a method of treatment of the present invention, the herein described hypoglycemically effective fluorobenzylguanidines can be administered to a diabetic subject via the oral route of administration. In general, these compounds are most desirably administered in doses ranging from about 25 mg. up to about 1.0 g. per day, although variations will still necessarily occur depending upon the weight of the subject being treated. However, a dosage level that is in the range of from about 0.4 mg. to about 15 mg. per kg. of body weight per day is most desirably employed in order to achieve effective results. Nevertheless, it is still to be appreciated that other variations may also occur in this respect, depending upon the species of animal being treated and its individual response to said medicament, as well as on the particular type of oral pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects to occur provided that such higher dose levels are fist divided into several smaller doses that are to be administered throughout the day.

In connection with the use of the fluorobenzylguanidine compounds of this invention for the treatment of diabetic subjects, it is to be noted that they may be administered either alone or in combination with pharmaceutically acceptable carriers and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically effective compounds of this invention are present in such dosage forms at concentration levels ranging from about 0.5 percent to about 90 percent by weight of the total composition, i.e., in amounts which are sufficient to provide the desired unit dosage.

In the latter connection, the compounds of this invention may be administered in suitable unit dosage forms which will preferably contain at least about 5 mg.

per dosage unit, although concentration levels in the range of from about 5 mg. to about 250 mg. per unit dosage per day may be employed to advantage. When larger doses of these hypoglycemic agents are to be employed, it is preferably to administer two or more unit doses at various time intervals, adjusting, if necessary, the content of the antidiabetic agent per unit dosage form accordingly. Moreover, multiple dose treatment has indicated the feasibility, in some instances, of administering the fluorobenzylguanidine-containing compositions at periodic time intervals, e.g., by orally administering the hypoglycemic agent to an afflicted subject at a dosage level that is in the range of approximately 0.200–1.0 g. per day, divided into about two to about five doses of equal strength that are to be administered throughout the day. Furthermore, optimum results can often be achieved in such cases by administering a higher dose initially, followed by the administration of a maintenance dose of therapy at a lower dosage thereafter, e.g., 1.0 g. the first day, 0.6 g. the second day, 0.4 g. the third day and 0.2 g. per day thereafter.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally; lubricating agents such as magnesium stearate, sodium lauryl sulfate and talc are often very useful for tabletting purposes. Solid compositions of a similar type may also be employed as fillers in soft and hardfilled gelatin capsules; preferred materials in this connection would also include the high molecular weight polyethylene glycols. When aqueous suspensions and/or elixirs are desired for oral administration, the essential active ingredient therein may be combined with various sweetening or flavoring agents, coloring matter or dyes and, if so desired, emulsifying and/or suspending agents as well, together with such diluents as water, ethanol, propylene glycol, glycerin and various like combinations thereof.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

A mixture consisting of 13.8 g. (0.110 mole) of m-fluorobenzylamine and 10.0 g. (0.072 mole) of 2-methyl-2-thiopseudourea hydrogen sulfate i.e., S-methyl isothiouronium sulfate) in 25 ml. of water was heated on a steam bath for eight hours. At the end of this time, the solvent was removed by means of evaporation under reduced pressure and the remaining residue was triturated with isopropanol. The resulting solid (15.7 g.) was then filtered and recrystallized from isopropanol-water to give 11.0 g. of m-fluorobenzylguanidine hydrogen sulfate, m.p. 173.5°–175.5° C.

Anal. Calcd. for $C_8H_{10}FN_3 \cdot 1/2H_2SO_4$: C, 44.43; H, 5.13; N, 19.53.
Found: C, 44.45; H, 5.10; N, 19.45.

EXAMPLE II

The procedure described in the previous example was repeated, only this time employing as the reactants 9.9 g. (0.079 mole) of p-fluorobenzylamine and 10.4 g. (0.075 mole) OF 2-methyl-2-thiopseudourea hydrogen sulfate in 25 ml. of water to give 7.8 g. of p-fluorobenzylguanidine hydrogen sulfate, m.p. 190°–192° C. after recrystallization from methanol.

Anal. Calcd. for $C_8H_{10}FN_3 \cdot 1/2H_2SO_4$: C, 44.43; H, 5.13; N, 19.43.
Found: C, 44.45; H, 4.70; N, 19.10.

EXAMPLE III

A mixture consisting of 11.65 g. (0.132 mole) of m-fluorobenzylamine and 12.2 g. (0.065 mole) of 1-guanyl-3,5-dimethylpyrazole hydrogen sulfate in 40 ml. of water is heated on a steam bath (at≈90° C.) for 5 hours. At the end of this time, the reaction mixture is cooled to room temperature (≈25° C.) and the crude crystalline material which forms at this point is subsequently collected by means of suction filtration. After several recrystallizations from isopropanol-water, including one in the presence of a trace of concentrated sulfuric acid, there is obtained pure m-fluorobenzylguanidine hydrogen sulfate, identical in every respect with the product of Example I.

EXAMPLE IV

The procedure described in the preceding example is repeated only this time employing p-fluorobenzylamine as starting material in place of the corresponding meta isomer used before. In this particular case, the corresponding final product obtained is p-fluorobenzylguanidine hydrogen sulfate, identical in every respect with the product previously reported in Example II.

EXAMPLE V

The procedure described in Example I is repeated employing 2-methyl-2-thiopseudourea hydrofluoride as reagent in place of the corresponding sulfate salt. In this particular case, the final product obtained is m-fluorobenzylguanidine hydrofluoride.

In like manner, p-fluorobenzylamine and 2-methyl-2-thiopseudourea hydrofluoride react to afford p-fluorobenzylguanidine hydrofluoride.

EXAMPLE VI

Ten parts by weight of m-fluorobenzylguanidine hydrogen sulfate in 50 parts by volume of water are neutralized with 10N sodium hydroxide solution. Extraction of the resulting aqueous solution with several portions of methylene chloride, followed by separation of the organic layer and its subsequent concentration under reduced pressure then affords m-fluorobenzylguanidine as a free base.

In like manner, when p-flurobenzylguanidine hydrofluoride is subjected to this very same reaction procedure, the corresponding free organic base compound, viz., p-fluorobenzylguanidine, is obtained.

EXAMPLE VII

The non-toxic hydrohalide acid addition salts of each of the fluorobenzylguanidine bases obtained in Example VI, viz., the hydrochloride, hydrobromide and hydroiodide salts, are each individually prepared by first dissolving the respective organic base compound in absolute ether followed by introduction of the appropriate hydrogen halide gas into the reaction solution until saturation of same is complete with respect to said gas, whereupon the desired salt precipitates from solution. The crystalline product so obtained is then recrystallized from acetone-diethyl ether to yield the pure hydrohalide salt. For instance, when 1.0 g. of p-fluorobenzylguanidine is dissolved in anhydrous diethyl ether and dry hydrogen chloride gas is subsequently passed into the resulting solution until saturation of same is complete with respect to said gas, there is obtained a crystalline precipitate of p-fluorobenzylguanidine hydrochloride.

EXAMPLE VIII

The nitrate, sulfate, phosphate, acid phosphate, acetate, citrate, acid citrate, tartrate, bitartrate, succinate, maleate, gluconate, saccharate, methanesulfonate, ethanesulfonate, benzenesulfonate and p-toluenesulfonate salts of each of the fluorobenzylguanidine bases obtained in Example VI are all prepared by separately dissolving in a suitable amount of ethanol the proper molar amounts of the respective acid and the appropriate organic base and then mixing the two solutions together, followed by the addition of diethyl ether to to the resulting reaction solution in order to effect precipitation of the desired acid addition salt therefrom. For instance, when equivalent amounts of m-fluorobenzylquanidine and p-toluenesulfonic acid react in accordance with this procedure, the corresponding product obtained is m-fluorobenzylguanidine p-toluenesulfonate. In like manner, each of the other salts is similarly prepared.

EXAMPLE IX

A dry solid pharmaceutical composition is prepared by blending the following materials together in the proportions by weight specified below:

| | |
|---|---|
| p-Fluorobenzylguanidine hydrogen sulfate | 50 |
| Sodium Citrate | 25 |
| Alginic acid | 10 |
| Polyvinylpyrollidone | 10 |
| Magnesium stearate | 5 |

After the dried composition is thoroughly bended, tablets are punched from the resulting mixture, each tablet being of such size that it contains 100 mg. of the active ingredient. Other tablets are prepared in a similar manner, containing 5, 10, 25 and 50 mg. of the active ingredient, by merely using the appropriate amount of the fluorobenzylguanidine salt in each case.

EXAMPLE X

A dry solid pharmaceutical composition is prepared by combining the following materials together in the proportions by weight indicated below:

| | |
|---|---|
| m-Fluorobenzylguanidine hydrogen sulfate | 50 |
| Calcium carbonate | 20 |
| Polyethylene glycol, average molecular weight 4000 | 30 |

The dried solid mixture so prepared is then thoroughly agitated so as to obtain a powdered product that is completely uniform in every respect. Soft elastic and hard-filled gelatin capsules containing this pharmaceutical composition are then prepared, employing a sufficient amount of material in each case so as to provide each capsule with 250 mg. of the active ingredient.

What is claimed is:

1. A process for lowering blood sugar levels in the treatment of a diabetic animal which comprises orally administering to said animal an effective blood sugar lowering amount of a compound selected from the group consisting of the pharmaceutically acceptable acid addition salts of meta-and para-fluorobenzylguanidine.

2. A process as claimed in claim 1 wherein the compound administered is a pharmaceutically acceptable salt of para-fluorobenzylguanidine.

3. A process as claimed in claim 1 wherein the compound administered is a pharmaceutically acceptable salt of PARA-fluorobenzylquanidine.

4. A process as claimed in claim 1 wherein the compound administered is the hydrogen sulfate acid addition salt.

5. A process as claimed in claim 1 wherein the compound administered is m-fluorobenzylguanidine hydrogen sulfate.

6. A process as claimed in claim 1 wherein the compound administered is p-fluorobenzylguanidine hydrogen sulfate.

* * * * *